US007199701B2

(12) United States Patent
Kates

(10) Patent No.: US 7,199,701 B2
(45) Date of Patent: Apr. 3, 2007

(54) REPEATER UNIT

(76) Inventor: Lawrence Kates, 1111 Bayside Dr., Suite 11, Corona Del Mar, CA (US) 92625

( * ) Notice: Subject to any disclaimer, the term of this patent is extended or adjusted under 35 U.S.C. 154(b) by 0 days.

(21) Appl. No.: 10/718,374

(22) Filed: Nov. 19, 2003

(65) Prior Publication Data

US 2005/0107033 A1 May 19, 2005

(51) Int. Cl.
*H04B 3/36* (2006.01)

(52) U.S. Cl. ............................... 340/425.1; 340/539.1; 455/11.1

(58) Field of Classification Search ............. 340/539.1; 455/11.1, 13.1
See application file for complete search history.

(56) References Cited

U.S. PATENT DOCUMENTS

| | | | | |
|---|---|---|---|---|
| 5,015,917 | A | 5/1991 | Nigg | |
| 5,320,548 | A | 6/1994 | Schadhauser | |
| 5,432,500 | A | 7/1995 | Scripps | |
| 5,950,149 | A * | 9/1999 | Fieramosca et al. | 702/183 |
| 6,400,968 | B1 | 6/2002 | White et al. | |
| 6,696,967 | B1 | 2/2004 | Rutter et al. | |
| 6,894,609 | B2 * | 5/2005 | Menard et al. | 340/531 |
| 2003/0199247 | A1 * | 10/2003 | Striemer | 455/11.1 |
| 2004/0239263 | A1 | 12/2004 | Vakil et al. | |

FOREIGN PATENT DOCUMENTS

| | | | |
|---|---|---|---|
| DE | 19501417 | A1 | 7/1996 |
| EP | 0 346 152 | A2 | 12/1989 |
| EP | 0 346 152 | A3 | 12/1989 |
| WO | WO 00/21047 | A1 | 4/2000 |
| WO | WO 2005-057989 | | 6/2005 |

* cited by examiner

*Primary Examiner*—Daniel Wu
*Assistant Examiner*—George A. Bugg
(74) *Attorney, Agent, or Firm*—Knobbe, Martens, Olson & Bear, LLP

(57) ABSTRACT

A signal repeater for receiving and re-transmitting signals from environmental transducers and the like, and for mechanically and electrically cooperating with existing electrically powered fixtures. More particularly, the present invention includes a housing unit for mechanically and electrically coupling to the powered fixture, a transceiver unit, and a first power supply electrically connected to the transceiver circuit and housed by the housing unit. The repeater is adapted to maintain the functionality of the fixture.

13 Claims, 8 Drawing Sheets

REPEATER UNIT

FIELD OF THE INVENTION

The present invention relates to radio frequency wireless signaling systems, and more particularly to an improved repeater system which can be incorporated into electrically powered fixtures for supplying power to common electrical devices such as light bulbs, fluorescent tubes, circuit outlets and switches, or other electrical appliances. More particularly, the present invention relates to a repeater electrically coupled to an electrical fixture, and including a transceiver unit electrically connected to a first power supply, having a housing unit that is adapted to mechanically cooperate with an electrical fixture, whereby the repeater unit provides continuous operation even when electrical power from the electrical fixture is unavailable.

DESCRIPTION OF THE PRIOR ART

Known systems employ remote transducers to signal various observations to a base station, but may lack power to reach the destination, such as a centrally located station. One or more repeaters intercept the signal, amplify it and retransmit it until the destination is reached. For example, a transducer at a remote location can detect and signal smoke, temperature, humidity, wind speed and other important environmental parameters. Other transducers can provide signals representative of the state or the physical condition of an object or physical location.

Most buildings, including dwellings, are now equipped with transducers or sensors combined in a detector to monitor the performance and efficiency of heating, ventilation and air conditioning equipment. Other sensors incorporated in a smoke detector are used to monitor atmospheric parameters such as smoke level or temperature condition that warn of an fire. Still other sensors are used to signal a security breach, or other hazardous or dangerous condition.

For the most part, such detectors issue an audible or visible alarm, but not necessarily a signal that can be received in a centrally located station where someone can call for assistance. A repeater circuit associated with a transducer such as a smoke detectors or other fire sensors, if equipped with a wireless transmitter to broadcast a signal that includes the location of the sensor and the conditions being monitored could, if operated in conjunction with repeaters between the sensor and the base station, alert the base station to the change in conditions that can be interpreted as a fire.

But providing a power supply to such a repeater unit is troublesome because electrical outlets may not be readily available. Usually, within relatively close range of a detector are installed powered devices such as light fixtures or power outlets to which power is applied from a central location for predetermined and finite periods of time. For example, in a large residential complex such as an apartment building, area lights are illuminated during the hours of darkness and are not powered during the times when adequate ambient light is provided from natural sources. Thus, there is a need for a repeater unit that is suitable to be installed in an existing electrical receptacle so that signals from nearby detectors that need monitoring may be stored, amplified, and broadcast to a centrally located station and that provides other advantages and features over present repeater units, such as compactness and continuous operation even when electrical power from a receptacle is unavailable.

BRIEF SUMMARY OF INVENTION

The present invention relates to a repeater unit that are proximal to sensors to receive and retransmit signals, including circuits that power the transmit and the receive functions. Also present are circuits that respond to the intermittent provision of electrical power to recharge batteries which normally power the system when electrical power is absent. The frequent recharging of the batteries facilitate uninterrupted communication between the sensors and the base station.

In a preferred embodiment, the repeater unit is designed to mate with an existing light bulb socket so that it can be interposed between a light bulb and the socket. Since the repeater unit also includes a light bulb socket, that must be done to install the repeater unit is remove the light bulb from the socket, insert the repeater unit and return the light bulb to the socket of the repeater unit. During daylight hours, while the light bulb is not being powered-on, the rechargeable batteries permit operation of the repeater unit to relay sensor information to the central location such as a base station. In the evening, when the lights are powered-on, the repeater unit is also powered-on and the batteries are recharged. Thereby, the repeater unit provides continuous operation even when electrical power from a light bulb socket or other receptacle is unavailable.

In other embodiments, the repeater unit is installed in a fluorescent light fixture and connected to the power lines. In additional embodiments, the repeater unit could be installed in EXIT signs or even switches. In yet other embodiments, the repeater unit can be incorporated in outlet receptacles where the power always is present to the unit and the batteries provide a back up in the event of a loss of power to the premises.

DESCRIPTION OF THE DRAWINGS

For a better understanding of the present invention, reference is made to the below referenced accompanying drawings. Reference number refer to the same or the equivalent parts of the present invention throughout the several figures of the drawings.

DETAILED DESCRIPTION OF THE INVENTION

Figure 1:
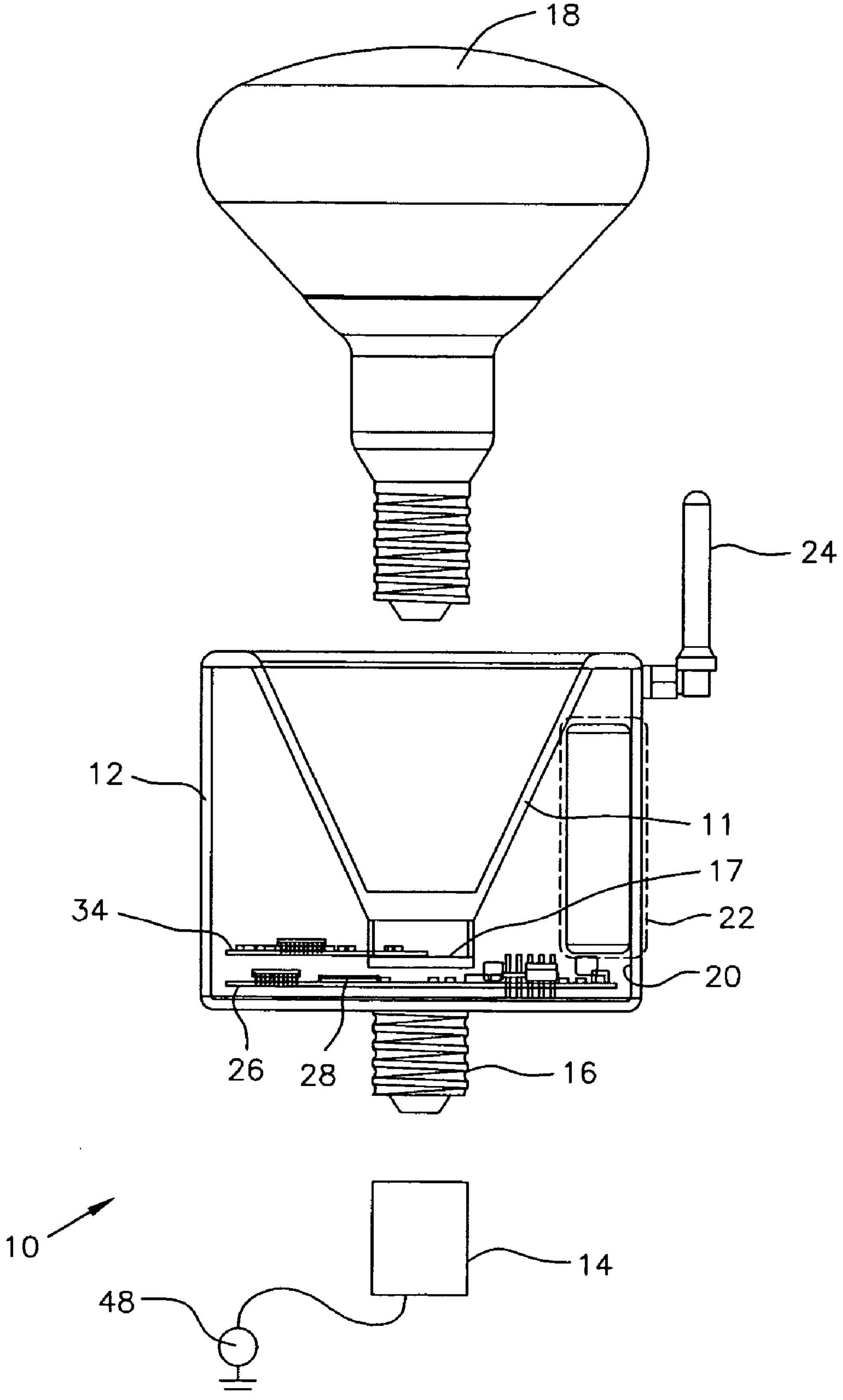
FIG. 1 is a side, partially sectioned view of repeater incorporated in a lamp base according to the present invention.

Referring to FIG. 1, there is shown one preferred embodiment of the present invention in which a repeater unit is adapted to install into an electrical light socket 14. In FIG. 1, a repeater unit 10 comprises a housing unit 12 fitted with a first mating structure 16 which is adapted to mechanically and to electrically cooperate with the electrical light socket 14. The repeater unit 10 further comprises a first power supply 22 to provide power to the repeater unit 10. In one preferred embodiment, the electrical light socket 14 is a candelabra socket and the first mating structure 16 is adapted to fit the candelabra socket. It should be noted that the electric light socket 14 is electrically connected to the second power supply 48 that provides electrical power. In one preferred embodiment, the electrical light socket 14 maintains its existing functionality when repeater unit 10 is installed. Further, in this embodiment, the first mating structure 16 is a standard candelabra base that mechanically and electrically cooperates with the candelabra socket. Additionally, it should be noted that the first mating structure 16 may be any mechanical structure that mates with an electrical receptacle. Electrical light socket 14 may be an electrical outlet, an electrical receptacle, an electrical fixture, a power supply fixture, an existing fixture, an electrically powered fixture, a fixture or a fixture that is associated with a second power supply 48.

The housing unit 12 may further comprise a heat shield 11. The head shield 11 acts as a reflector for light when a light bulb 18 is powered-on. However, it should be noted that even though the light bulb 18 is depicted in the figure as a incandescent flood light bulb, a repeater according to the present invention is designed to cooperate with other light fixtures such as a fluorescent light, a fluorescent tube, a neon light, a neon tube, other light sources or common electrical devices come within the spirit and the scope of the present invention. In addition, the housing unit 12 comprises a housing interior walls 20, wherein the first power supply 22 is mounted between the housing interior wall 20 and the heat shield 11, the first power supply 22. Mounted to the housing unit 12 is an antenna 24 which transmits and receives wireless signals. The antenna 24 is depicted as a monopole antenna but may be any device that will receive and transmit wireless signals. A repeater circuit board 26 is located at the base of the housing interior while a second circuit board 34 is connected to a second mating structure 17 that is adapted to insert a light source such as a light bulb 18. Further, the second mating structure 17 is electrically connected to the second power source 48. In one preferred embodiment, the repeater circuit board 26 comprises a transceiver circuit 28. In addition, the first power supply 22, which may include a rechargeable power storage module, comprising a rechargeable power storage cell and a power recharger, to provide energizing power to set the desired operating point for the transceiver circuit 28.

Figure 2A:
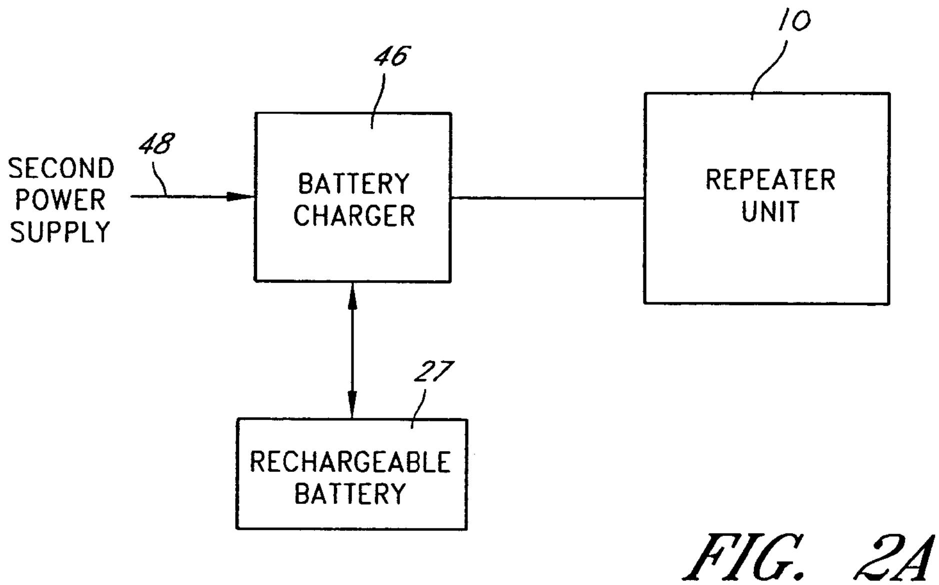
FIGS. 2A, 2B are block diagrams of the circuits of the embodiment of FIG. 1.
Figure 2B:
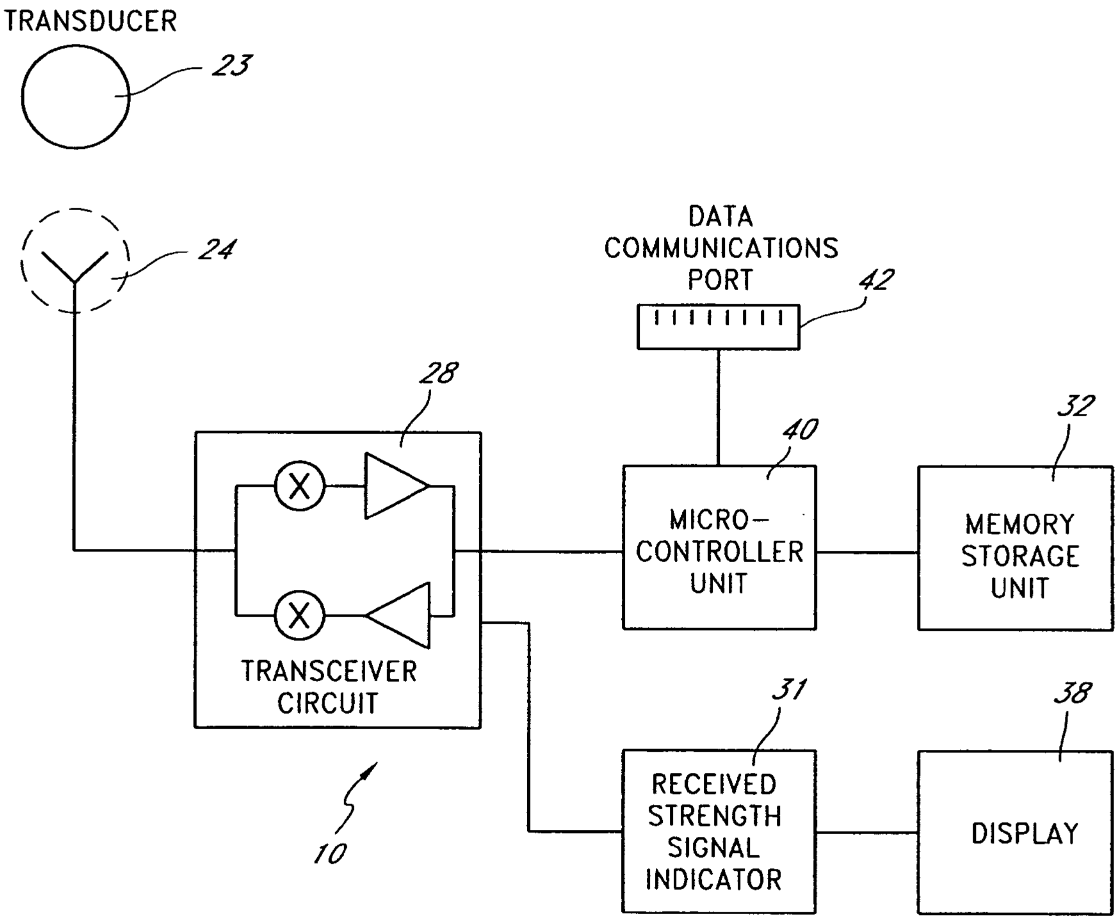

Referring to FIGS. 2A and 2B, block diagrams of the repeater circuit board 26 is shown. In one preferred embodiment, the first power supply 22 is a rechargeable battery module including a rechargeable battery 27 and a battery charger 46. It should be noted that the first power supply 22 may be any electrical storage device such as a nickel cadmium battery, a lithium-ion battery, a rechargeable power storage module, or any device that provides electrical energy. It should also be noted that a power recharger may be any device that charges a rechargeable power storage cell such as a solar panel array, transformer, electrical circuit board or other electrical circuit. The second power supply 48 is a source of energy from the electrical light socket 14. The second power supply 48 furnishes electrical energy to the battery charger 46. The battery charger 46, in turn, powers the transceiver circuit 28 and recharges the rechargeable battery 27 when power from the second power supply 48 is available, i.e., powered-on. When the second power supply 48 is not available, not being supplied, or powered-off to the mating structure 16, the first power supply 22 powers the repeater unit 10.

The repeater circuit board 26 further comprises a first system and a second system. The first system includes the transceiver circuit 28, a received signal strength indicator 31 and a display 38. The second system includes a micro-controller unit 40, a memory storage unit 32 and a data communication port 42. In one preferred embodiment, the transceiver circuit 28 is a Texas Instruments, Part No. TRF6901 RF transceiver circuit. However, the transceiver circuit 28 may be any similar transmit/receive circuit that will receive and transmit electrical signals. In this embodiment, the transceiver circuit 28 receives at least one electrical signal from the antenna 24. The signal is as a Radio Frequency (RF), a microwave or millimeter wave signal. The signal originates at a transducer 23, which may by example be located in a building, such as an apartment or office building, which measures environmental parameters such as smoke index, particulate matter, moisture, humidity, pressure or temperature. By way of other examples, the transducer 23 may be located in an exit sign, a fire alarm, an air-conditioning unit, or other locations where a user desires to monitor the environmental parameters and to send this information to another location, such as a repeater or a base station.

After the transceiver circuit 28 receives and processes the signal representing the measured environmental parameter, the signal is electrically coupled to the micro-controller 40. In one preferred embodiment, the micro-controller is a Xilinix, Part No. XE2S100E. Generally, the micro-controller evaluates the signal, then categorizes and maps the signal into representative values for storage within the memory storage unit 32. In one preferred embodiment, the memory storage unit 32 is a Microchip, Part No. #93AA56A, but, other memory storage devices may be substituted and are also included within the scope of this invention. Following, the micro-controller 40 may send the representative values back through the transceiver circuit 26 for re-transmission through the antenna 24 to a centrally located station, a centralized database station, another repeater unit, or other destination.

The data communication port 42 provides control and data signals to the micro-controller unit 40. Such control and data signals used to program, to reprogram, to enter data, or to remove data which may be stored internally within the micro-controller unit 40 or externally within the memory storage unit 32. In one mode, the control and data signals program the micro-controller unit 40 to determine which of the signals received by the antenna 24 is to be processed further by the transceiver circuit 28. In another mode, the control and data signals program the micro-controller 32 to store such signals in the memory storage unit 32. In another mode, the control signals program the micro-controller unit 32 to select which of the stored signals is to be retrieved from the memory storage unit 32, and which of them are to be transmitted from the transceiver unit 28 through the antenna 24, to the next repeater unit, the base station, centrally located station, or centralized database station. The following paragraphs address alternative component packaging for a repeater unit of the present invention. The repeaters described in the following paragraphs are not hard-wired, but rather plug into an existing socket. Additionally, the repeaters described below may include sockets for use with other electrical appliances in the same way that the first embodiment includes sockets for the light bulb that was removed to install the repeater.

Figure 3:
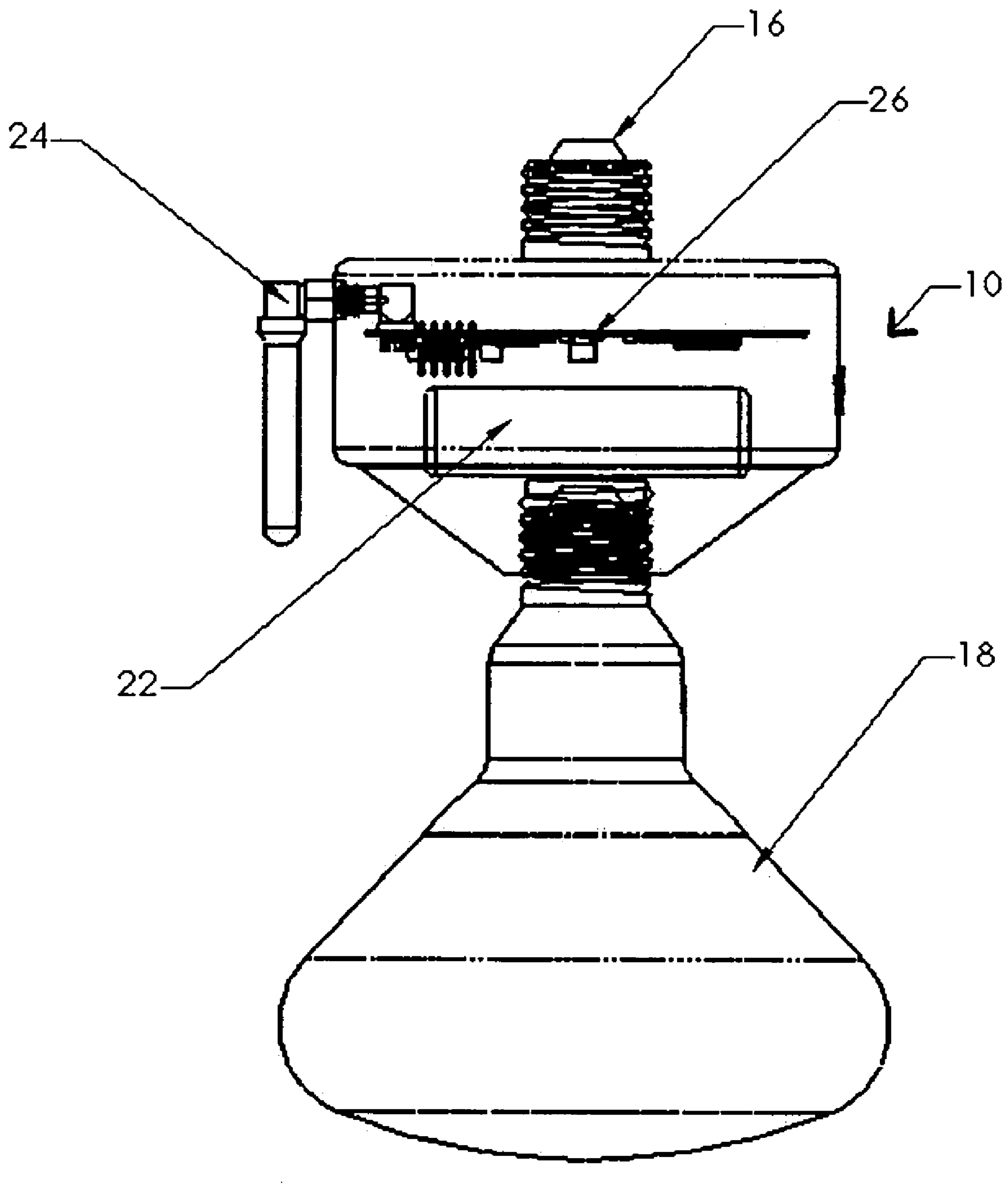
FIG. 3 is an alternative embodiment of the present invention in which a repeater unit incorporates into an R30 light fixture.

Referring to FIG. 3, an alternative embodiment of the present invention is shown, in which a repeater unit 10 allows insertion of an R30 light bulb and fits into an R30 light fixture. This embodiment includes the same components and functionality as the FIG. 1 embodiment including the repeater board 26, the antenna 24 and the first power supply 22 and other circuitry (not shown) but described functionally in FIGS. 2A and 2B. The major difference from the FIG. 1 embodiment is that this alternative embodiment fits into an R30 light fixture.

Figure 4A:
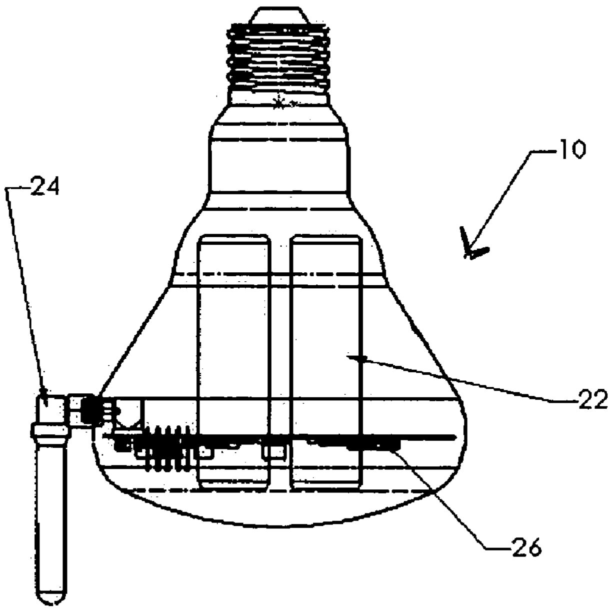
FIG. 4A is another alternative embodiment of the present invention in which a repeater unit is incorporated within a light bulb.

Referring to FIG. 4A, another alternative embodiment of the present invention is shown, in which a repeater unit 10 is packaged within a light bulb. This embodiment includes the same components and functionality as the FIG. 1 embodiment including the repeater board 26, the antenna 24, and the first power supply 22 and other circuitry (not shown) but described functionally in FIGS. 2A and 2B. The major difference from the FIG. 1 embodiment is that in this alternative embodiment, the repeater unit 10 looks like a light bulb.

Figure 4B:
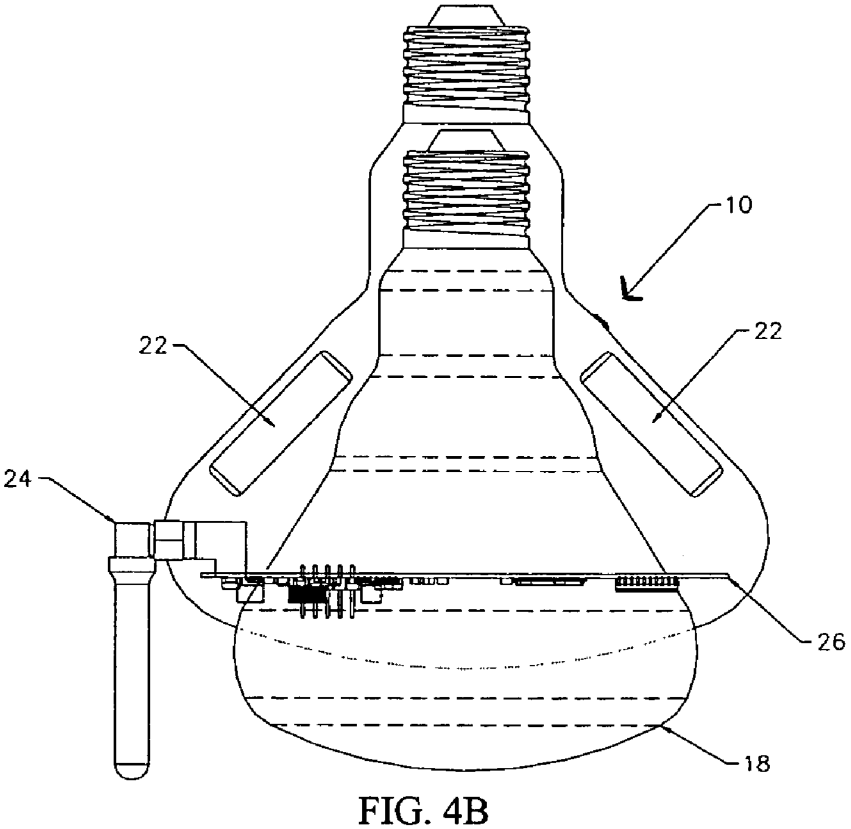
FIG. 4B is another alternative embodiment of the present invention in which a repeater unit is a light bulb shaped fixture that cooperates with a light bulb.

Referring to FIG. 4B, another alternative embodiment of the present invention is shown, in which a repeater unit 10 is a light bulb shaped fixture that cooperates with another a light bulb. This embodiment includes the same components and functionality as the FIG. 1 embodiment including the repeater board 26, the antenna 24, and the first power supply 22 and other circuitry (not shown) but described functionally in FIGS. 2A and 2B. The major difference from the FIG. 1 embodiment is that in this alternative embodiment, the repeater unit 10 looks like a light bulb and cooperates with another light bulb.

Figure 5A:
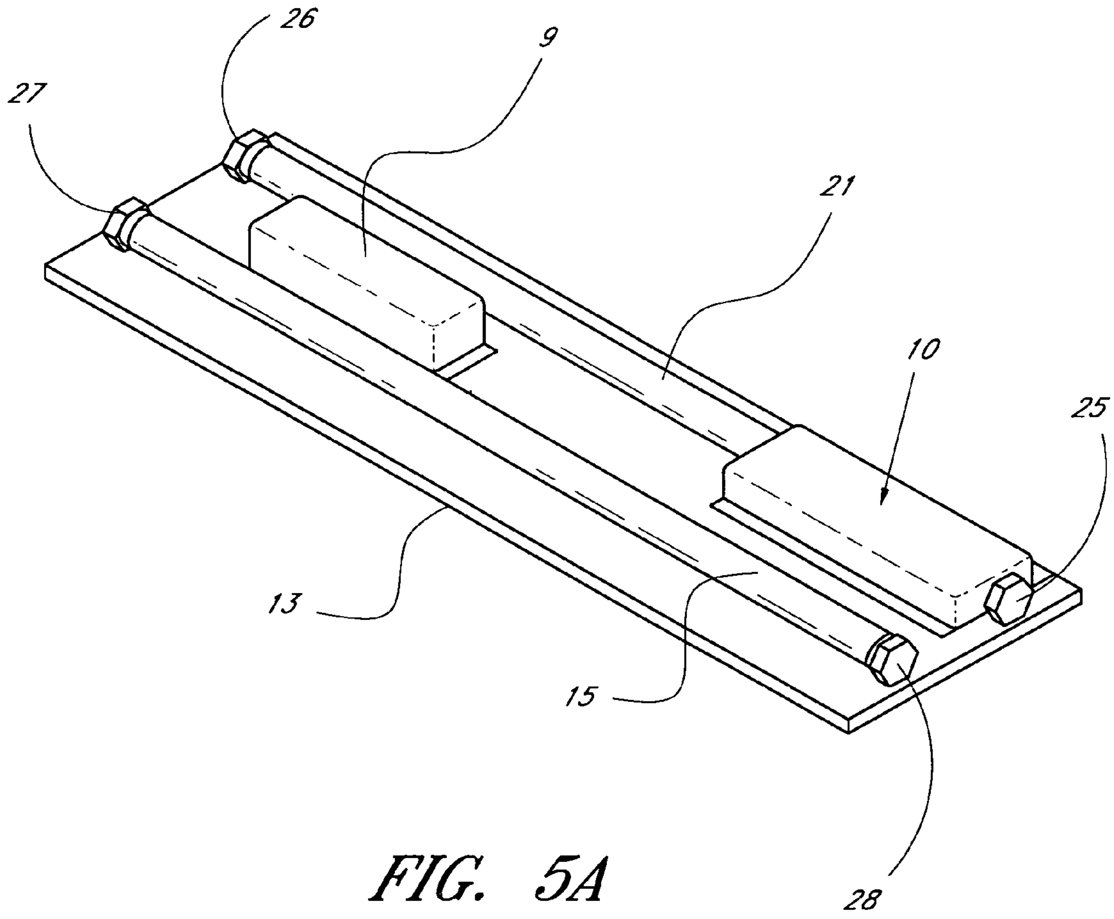
FIGS. 5A and 5B is an alternative embodiment of the present invention in which a repeater unit is incorporated within a fluorescent light fixture.
Figure 5B:
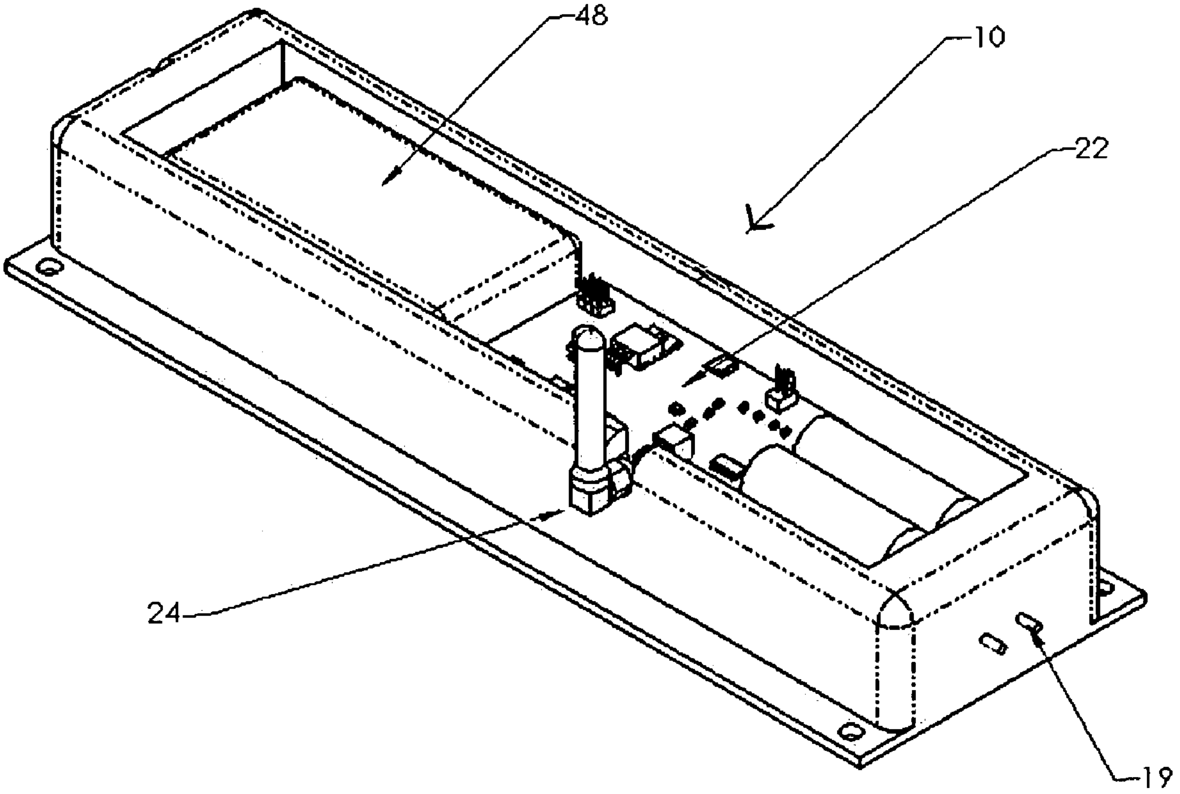

Referring to FIGS. 5A, 5B, an additional alternative embodiment of the present invention is shown in which the repeater unit 10 is incorporated with a fluorescent light fixture 13 that includes a ballast 9 and fluorescent light sockets 25–28. This embodiment includes the same components and functionality as the FIG. 1 embodiment including the repeater board 26, the antenna 24, and the first power supply 22 and other circuitry (not shown) but described functionally in FIGS. 2A and 2B. The major difference from the FIG. 1 embodiment is that this alternative embodiment repeater unit 10 plus a first fluorescent light bulb 21 replaces a standard fluorescent light bulb. The repeater unit 10 includes a plug 19 that fits into a fluorescent light fixture socket (not shown in FIG. 5B) and is mechanically adapted to accept a first fluorescent bulb 21 so that the functionality of the fluorescent light fixture 13 is maintained. Moreover, a second fluorescent bulb 15 also fits into the fluorescent light fixture 13 to permit more light. The repeater described in the next two paragraphs is not hard-wired, but rather plugs into an existing socket. Additionally, the repeaters described below include sockets for use with other electrical appliances in the same way that the first embodiment includes sockets for the light bulb that was removed to install the repeater. Finally, installation should be described in the same way installation was described for the first embodiment.

Figure 6:
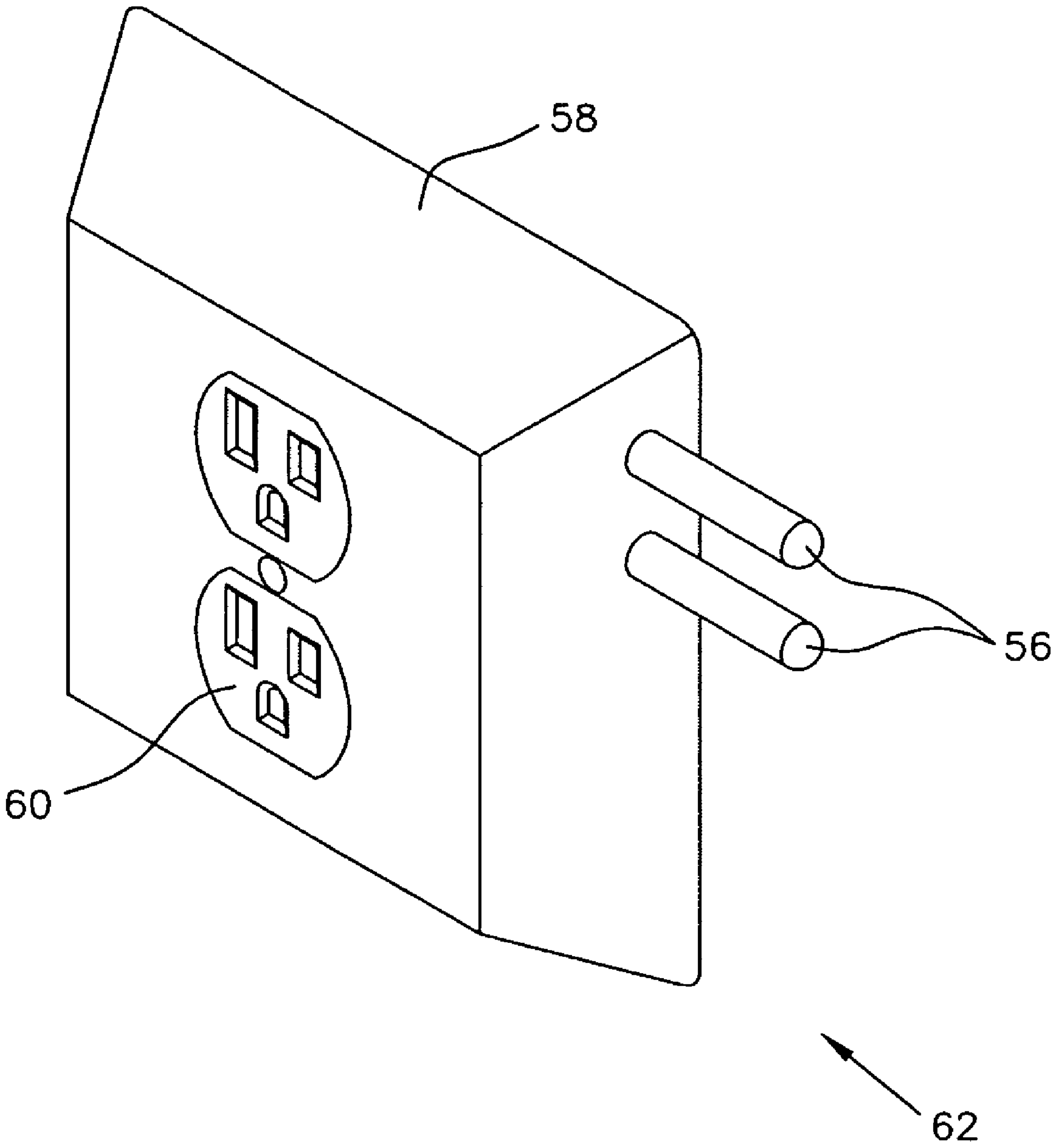
FIG. 6 is a perspective view of an alternative embodiment of the present invention in which a repeater is incorporated into an electrical outlet.

Referring to FIG. 6, a perspective view is shown of an alternative embodiment of the present invention in which a repeater is incorporated into a service outlet 62. A service outlet 62 is an electric outlet but may be any outlet that provides a source of electrical energy. In particular, a service outlet repeater unit 60 (not shown) is installed into the plastic housing 58. Further, the service outlet repeater unit 60 (not shown) includes outlet repeater antennas 56 to receive and to transmit electric signals to and from repeaters, base stations, or other destinations such as a centrally located data center. However, the major difference from other preferred embodiments discussed elsewhere in this specification is that this alternative embodiment is plugged into an existing electrical outlet or socket instead of inserted into an electrical light receptacle.

Figure 7:
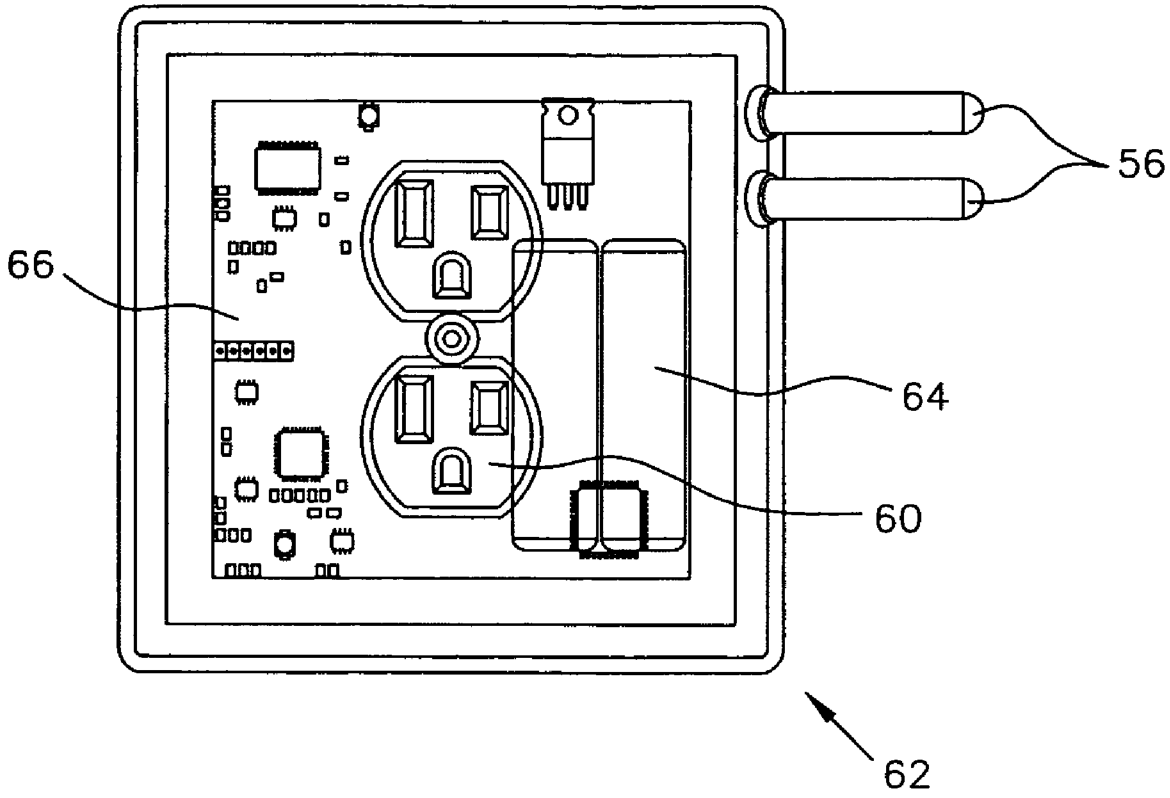
FIG. 7 partly sectional, partly phantom view of outlet of FIG. 6.

Referring to FIG. 7 is a partly sectional, partly phantom view of the service outlet 62 of FIG. 6. This alternative embodiment houses the service outlet repeater unit 60 within the service outlet 62 has the same functional aspects and same basic component building blocks as shown in FIGS. 2A and 2B. In particular, the service outlet repeater unit 60 comprises the following components: the plastic housing 58 (as shown in FIG. 3); the service outlet 62 (functionally equivalent to the second power supply 48); outlet batteries 64 (functionally equivalent to the first power supply 22); a transceiver/repeater printed circuit board 66 (functionally equivalent to the RF circuit board 26); and outlet repeater service antennas 56 (functionally equivalent to the antenna 24). The service outlet repeater unit 60 draws power from the outlet batteries 64 during periods of time the service outlet 62 is not powered, e.g., blown fuse or when power is unavailable. The service outlet repeater unit 60 recharges the outlet batteries 64 and powers the service outlet repeater unit 60 during periods when the service outlet 62 is energized, i.e., powered-on. It should be noted that the choice for components are only exemplary in nature including: the plastic housing which may be any housing unit, a service outlet which may be any wired electrical receptacle, and the outlet batteries, which may be any rechargeable storage device. As such, these possible variations in components are included within the scope of this invention.

Further, in another embodiment of FIG. 6, a repeater unit may further be hard-wired into an existing electrical outlet. In this embodiment, the component functionality is the same as discussed in the above embodiments, however, the installation would be different such as requiring partial or full removal of existing wall outlet plug, and electrical connection of a repeater unit to existing wires disconnected from a existing wall outlet and mounting to the surface associated with an existing wall outlet.

Further, in another embodiment of FIG. 6, a repeater unit is adapted to replace a building accouterment while maintaining said functionality of said building accouterment. The building accouterment is by way of example, a ceiling tile, a heating and ventilation and air conditioning (HVAC) grill, a ceiling speaker, a ceiling speaker tile, and a speaker grill or speaker attached to the wall of the building or the like. In this embodiment, a first power supply may be the sole source of electrical power for the repeater unit. An alternative of this embodiment, both a first power supply and a second power supply may supply power to the repeater unit. Further, in this embodiment, the installation would be different than FIG. 6 above, including removal of the building accouterment which is well known in the art, and installation of the repeater unit adapted to replace a building accouterment.

Information as herein shown and described in detail is fully capable of attaining the above-described object of the invention, the present preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean “one and only one” unless explicitly so stated, but rather “one or more.” All structural and functional equivalents to the elements of the above-described preferred embodiment and additional embodiments that are known to those of ordinary skill in the art are hereby expressly incorporated by reference and are intended to be encompassed by the present claims.

Moreover, no requirement exists for a device or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, one skilled in the art should recognize that various changes and modifications in form and material details may be made without departing from the spirit and scope of the inventiveness as set forth in the appended claims. No claim herein is to be construed under the provisions of 35 U.S.C. § 112, sixth paragraph, unless the element is expressly recited using the phrase “means for.”

What is claimed is:

1. A repeater for mounting to an electrically powered fluorescent light fixture, said repeater unit comprising:

- a transceiver unit;
- a first power supply electrically coupled to said transceiver unit;
- a plug configured to mate with a fluorescent light fixture socket;
- a housing unit for housing the transceiver and first power supply, wherein said plug is provided to said housing unit, said housing unit adapted to accept a fluorescent bulb; and
- a first fluorescent bulb, in conjuction with said repeater, configured to replace a standard fluorescent bulb, said first fluorescent bulb provided to said housing to allow functionality of the fluorescent light fixture to be maintained.

2. The repeater in accordance with claim 1, wherein said first power supply includes a rechargeable power storage module, said module being recharged by said electrical power when supplied to said fluorescent light fixture socket.

3. The repeater in accordance with claim 1, wherein said first power supply includes a rechargeable power storage cell and a power charger, said power charger recharging said rechargeable power storage cell when electric power is supplied to said fluorescent light fixture socket.

4. The repeater in accordance with claim 1, wherein said housing unit further includes at least one fluorescent light socket.

5. The repeater in accordance with claim 1, wherein said housing unit comprises a first mating structure for mechanically installing into said fluorescent light fixture.

6. The repeater in accordance with claim 1, wherein said housing unit further comprises a fluorescent light socket for maintaining said fluorescent light fixture functionality.

7. The repeater in accordance with claim 1, wherein said first power supply is powered-on when said fluorescent light fixture is powered-off.

8. The repeater in accordance with claim 1, wherein said first power supply is powered-off when said fluorescent light fixture is powered-on.

9. The repeater in accordance with claim 1, wherein said first power supply is being recharged when said fluorescent light fixture is powered-on.

10. The repeater in accordance with claim 1, wherein said first power supply is adapted to provide power to said transceiver unit even when electrical power is unavailable to the fluorescent light fixtures.

11. The repeater in accordance with claim 1, wherein said fluorescent light fixture is located in an apartment building and a transducer sends a signal to said electrically powered fixture.

12. A repeater in accordance with claim 1, wherein said transceiver unit receives a signal from at least one transducer and re-transmits said signal to a base station.

13. A repeater in accordance with claim 1, wherein said housing unit is adapted to insert into an exit sign.

* * * * *

UNITED STATES PATENT AND TRADEMARK OFFICE

CERTIFICATE OF CORRECTION

PATENT NO. : 7,199,701 B2
APPLICATION NO. : 10/718374
DATED : April 3, 2007
INVENTOR(S) : Lawrence Kates It is certified that error appears in the above-identified patent and that said Letters Patent is hereby corrected as shown below:

On the Title Page Item [75] (Inventor's Residence) at line 2, change "Suite 11," to --Suite 111,--.

On the Title Page, [56] Column 1 (U.S. Patent Documents) at line 5, below "5,950,149 A" delete --6,400,968 B1 6/2002 White et al.--.

In Column 7 at line 37, in Claim 1, change "conjuction" to --conjunction--.

Signed and Sealed this

Twentieth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,199,701 B2
APPLICATION NO. : 10/718374
DATED : April 3, 2007
INVENTOR(S) : Lawrence Kates It is certified that error appears in the above-identified patent and that said Letters Patent is hereby corrected as shown below:

On the Title Page (Inventor's Residence) at line 2, change "Suite 11," to --Suite 111,--.

On the Title Page, Column 1 (U.S. Patent Documents) at line 5, below "5,950,149 A" delete "6,400,968 B1 6/2002 White et al.".

In Column 7 at line 37, in Claim 1, change "conjuction" to --conjunction--.

Signed and Sealed this

Twenty-seventh Day of May, 2008

JON W. DUDAS
*Director of the United States Patent and Trademark Office*